Dec. 2, 1941. C. L. PETERSON 2,264,639
RECAP TIRE BALANCING DEVICE
Filed Dec. 22, 1939 2 Sheets-Sheet 1

Inventor:
Chris L. Peterson
By Martin E. Anderson
Attorney

Dec. 2, 1941.                C. L. PETERSON                    2,264,639
                        RECAP TIRE BALANCING DEVICE
                          Filed Dec. 22, 1939          2 Sheets-Sheet 2

*Inventor:*
*Chris L. Peterson*
By Martin E. Anderson
    *Attorney*

Patented Dec. 2, 1941

2,264,639

UNITED STATES PATENT OFFICE 2,264,639

RECAP TIRE BALANCING DEVICE

Chris L. Peterson, Cheyenne, Wyo.

Application December 22, 1939, Serial No. 310,535

1 Claim. (Cl. 144—288)

This invention relates to improvements in recap tire balancing devices of the type disclosed and claimed in applicant's copending application, Serial No. 299,490, filed October 14, 1939.

Due to the high speed at which the modern automobile travels, the effect of unbalanced conditions in wheels and tires is greatly increased over the effect that would be produced by a similar unbalanced condition with the older and slower speed of travel.

When tires have become worn to a certain extent, it is customary to subject them to a recapping operation, whereby a new tire tread is applied to the old tire carcass and during this recapping operation it has frequently happened that the tires so repaired have become unbalanced to a considerable extent with the result that they have worn much faster than ordinarily would have been expected and aside from the excessive wear severe strains are also imposed on the wheels and wheel mountings by such unbalanced condition, due to the effect produced thereby at high speeds.

In the application above identified, applicant has described and claimed a device that is suitable for use in balancing tires. In that device, however, no provision has been made for adjusting the same to make it suitable for tires of different sizes with the result that a separate balancing device must be carried in stock for each size of tire repaired.

It is the object of this invention to produce a tire balancing device of a simple and substantial construction that can be readily adjusted so as to fit tires of different sizes, thereby obviating the necessity of carrying several balancing devices in stock.

This invention, briefly described, consists of a hub having an opening through which a shaft extends and projects from both sides. A number of spokes extend radially from the hub, and attached to these spokes are tire engaging means provided at their outer ends with transversely extending arms, whose function is to engage the inner surface of the tire. Means is provided for adjusting the tire engaging means radially on the hubs and for securing the same in predetermined positions, the parts being so proportioned that when the outer surfaces of the transverse tire engaging portions are positioned equal distances from the center of the shaft, the device will be perfectly balanced about the axis of the shaft.

Having thus briefly described the invention, the same will now be described in detail, and for this purpose, reference will be had to the accompanying drawings in which the invention has been illustrated in its preferred form, and in which.

Figure 1:
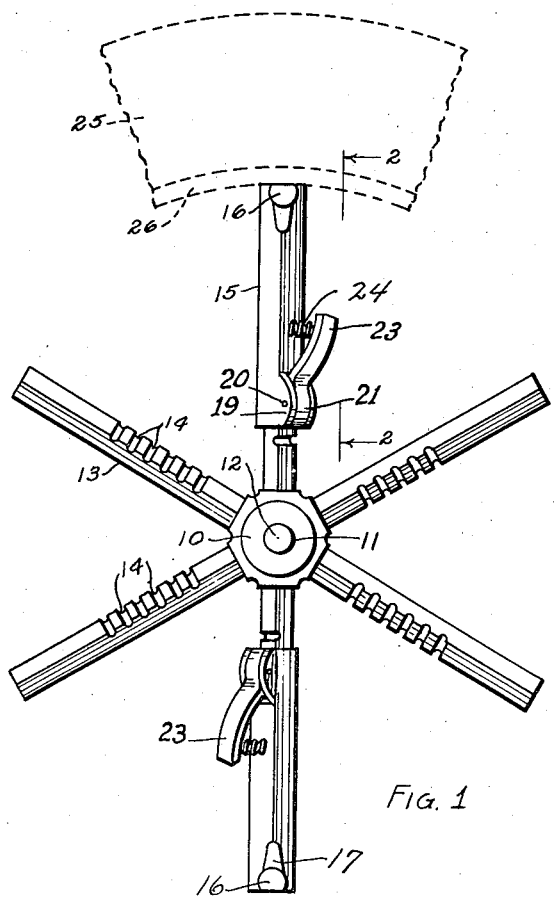
Figure 1 is a side elevation of the device that forms the subject of this application, some of the tire engaging means being removed so as to simplify the drawing and make the construction more clearly apparent.

In the drawings reference numeral 10 designates a hub which is provided with a central opening 11 through which a shaft 12 extends. The shaft projects to both sides of the hub. Extending radially from the hub are spokes 13 of which six have been shown in the embodiment illustrated. Although six spokes have been shown, a greater or lesser number of spokes may be used. In the specific form illustrated in Figure 1, the spokes are of rectangular cross-section and are provided on one side with transversely extending notches 14 which are spaced equidistantly from the center of the shaft. The distance between the notches is so calculated that each notch corresponds to a predetermined size of tire.

Figure 2:
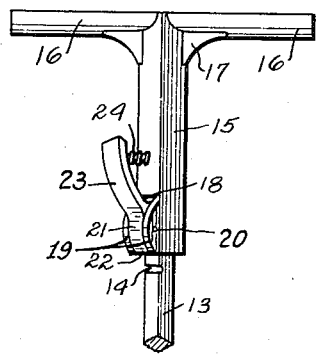
Figure 2 is a side elevation of one spoke with its attached tire engaging means, looking in the direction of arrows 2—2, Figure 1.

Telescopically connected with each spoke is a tire engaging means which has been indicated as a whole by reference numeral 15. The construction of this tire engaging means can be best seen from an inspection of Figure 2 from which it will be seen that it consists of a rectangular part having a rectangular opening for the reception of the spoke 13. The outer end of the tire engaging means is provided with laterally extending arms 16 that are preferably cast integral therewith and strengthened by gussets 17 which serve to make their connection with the body strong and rigid. One side of the tubular portion is provided with a notch 18 and outwardly extending side portions 19. Holes are provided for the reception of the rivet 20 and positioned between the sides 19 is a pawl 21 having one end provided with a part 22 that projects into a notch 14 and the other end provided with a handle 23 that is urged outwardly by a spring 24. When the parts are free to respond to the action of spring 24 the pawl will engage in one of the notches 14 and hold the tire engaging means in a predetermined position on the spoke. When adjustments as to size are to be made, handle 23 is moved inwardly against the action of spring 24, whereupon the pawl portion thereof is removed from the notch 14 with which it is in engagement, thereby permitting the tire engaging means to be adjusted longitudinally on the spoke. In the manufacture, care is taken to position each of the notches 14 the same distance from the center of the shaft as the corresponding notch in the other spokes. Wherefore, identical adjustments can be made on all of the spokes. Since the tire engaging means are duplicates, the distance from the center to the outer surfaces of the lateral extension arms 16 are equal when the pawl engages corresponding notches in the several spokes.

In the drawings reference numeral 25 designates a tire and reference numeral 26 designates the wall that bounds the central opening of the tire. When a tire of a certain size is to be tested and recapped, the device is first adjusted to fit the tire of that particular size, after which it is inserted into the tire in the manner quite apparent from an inspection of Figure 1. After the tire is in place, the assembly and the tire are positioned on two parallel supporting surfaces in a manner which will be hereinafter explained.

Figure 3:
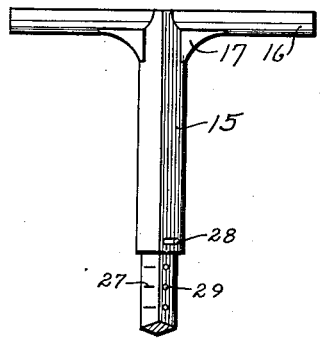
Figure 3 is a view similar to that shown in Figure 2 and illustrates a modified form of the invention.

Referring now to Figure 3, it will be seen that in this modification, the pawl 22, handle 23 and spring 24 have been dispensed with. One side of the spoke has been provided with marks 27 which indicate the position of the inner end of the tire engaging means when the same is in the proper position to be attached to the spoke by the pin 28. It will be observed that in this construction the spoke has been provided with a number of openings 29 and the tubular portion of the tire engaging means has its wall provided with openings which register with openings 29 and through which the pin 28 can be inserted for the purpose of interlocking the two parts.

Figure 4:
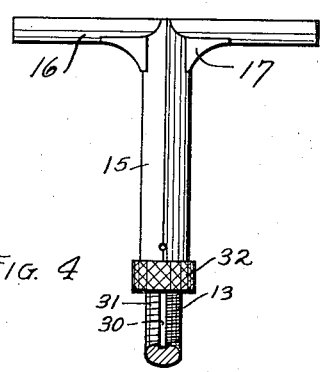
Figure 4 is a view similar to those shown in Figures 2 and 3, and shows a still further modification.

In Figure 4, another modification has been shown. In this modification the spoke has been shown as cylindrical and provided with a longitudinally extending groove 30. The outer surface of the spoke has been threaded as indicated by reference numeral 31 and engaging with these threads is a nut 32. By turning the nut, the tire engaging device can be adjusted longitudinally on the spoke. A pin or spline carried by the tubular portion of the tire engaging means projects into the groove 30 and holds the parts from relative rotation. With this construction, positioning marks, similar to marks 27 in Figure 3, are provided on the side of the spoke opposite from that illustrated in Figure 4.

Figure 5:
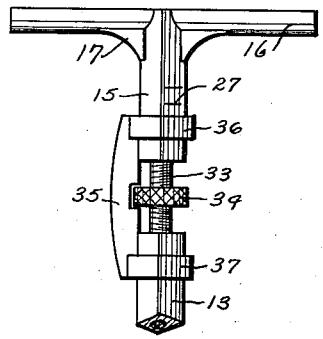
Figure 5 is a view similar to the one shown in Figure 4 and shows a still further modified form.

In Figure 5 a still further modified form has been shown. In this embodiment the spoke, as well as the tubular portion of the tire engaging means, is provided with threaded openings, one of which has a lefthand thread and the other a righthand thread. A screw 33, having its ends provided with right and left hand threads and a center portion provided with a knurled cylindrical part 34, is positioned between the end of the spoke and the inner end of the tire engaging device. A connector 35 is provided at its ends with rings 36 and 37. These rings have square openings that engage with the outer surfaces of the spoke and of the tire engaging device and hold the two from rotating relative to each other. The connecting portion 35 is also provided with a notch 38 into which the outer periphery of part 34 extends. Whenever the part 34, with its threaded end portions, is rotated in one direction or the other, it imparts a corresponding movement to the tire engaging device and the latter can therefore be adjusted along the spoke to fit any desired size of tire. Positioning marks 27 facilitate the setting of the parts so as to obtain a static balance.

Figure 6:
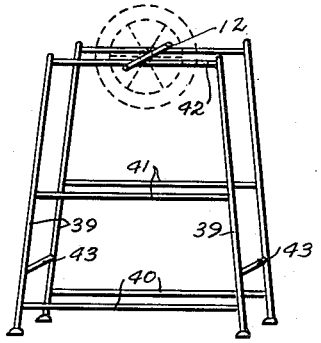
Figure 6 is a perspective view showing a support for use in the balancing operation, the balancing device and the tire being indicated by dotted lines.
Figure 7:
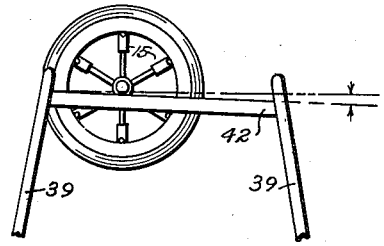
Figure 7 is a fragmentary side elevation showing a balancing device and tire positioned on the support.

In Figure 6, a support has been illustrated and this serves as a means for supporting the tire balancing device and tire during the testing operations. In the embodiment illustrated, this support is provided with four corner posts that have been designated by reference numerals 39. Two of these corner posts are connected by three pairs of transverse members 40, 41 and 42 and the parts of supporting device thus formed are connected by transverse members 43 in such a way as to form a support having the appearance illustrated. When this support stands on a floor that is perfectly level, the upper bars, which have been designated by reference numeral 42, incline slightly to the horizon as indicated most clearly in Figure 7. The inclination varies from one-half to five per cent. and is usually one quarter of an inch in ten inches of length. The corner posts extend a short distance above the upper bars 42, so as to form stops which prevent the balancing device and tire from rolling off, if left unattended.

It is evident that a frame like that shown in Figure 6 can be replaced by any suitable device for supporting the parallel bars 42 and the construction shown is therefore illustrative and not to be considered as a limitation.

When this device is to be employed in connection with recapping of a tire, it is first adjusted to the proper size by manipulating the connection between the spokes and the tire engaging means. When the parts have been adjusted to corresponding positions on the several spokes, the distance from the center of the shaft to the outer surface of the tire engaging means will be exactly equal and in this position the device is perfectly balanced with respect to the axis of the shaft. If such a balanced device is positioned on the support, the inclination of the supporting surfaces will permit the action of gravity to turn the device which will therefore roll slowly from a higher part to a lower part of the support. When a tire is to be tested, it is first positioned on the device in the manner shown in Figure 7 and the balancing device and the tire are then put into position on supports 42 near the higher ends thereof. Rubber for recapping is now applied to the tire and so positioned and adjusted that an exact balanced condition is obtained. It is evident that if the tire has a heavier spot positioned above the axis of rotation gravity will tend to move this downwardly and if the unbalanced condition is sufficient to overcome the effect of the incline support, the tire will come to rest with a heavier portion thereof at the bottom. If the unbalance is slight, the tire may continue to roll, but the rate will vary with the position of the heavier part, and it can therefore be easily observed from the action of the device whether the tire is balanced and the extent of such unbalancing.

In the above description and on the drawing, four specifically different means have been shown for effecting an adjustment of the tire engaging means with respect to the spokes, and it is evident that other equivalent means may be devised for this purpose.

Applicant does not desire to be limited to any specific adjusting means, but expects to be accorded protection under the law of mechanical equivalents to guard against the substitution of equivalent means to perform this function.

In Figure 1 the spokes have been shown square, and in Figure 4 the spoke has been shown round. The square spoke serves as a means for preventing relative rotation, but it is evident that the same effect can be produced when a round spoke is employed, if a groove 30 is provided and interengaged by a suitable pin fastened to the tire engaging means.

Particular attention is called to the inclined supports 42 for the reason that by inclining these supports, the testing can be greatly facilitated. If the supports are perfectly level, there will be no tendency to rotate the balancing device except the unbalanced condition of the tire. Whereas, when these supports are inclined, a perfectly balanced assembly will roll slowly along the inclined surfaces and if the unbalance is slight, the variation in speed is readily detected with the result that a test can be made more expeditiously when the device is supported on inclined supports than when it is supported on perfectly level supports.

Having described the invention what is claimed as new is:

A device for testing automobile tires for static balance, comprising in combination, a hub, a shaft extending through the hub and projecting from both sides thereof, a plurality of non-circular spokes extending radially from the hub, each spoke having a plurality of spaced notches, corresponding notches on the several spokes being positioned the same distance from the center of the hub, a tubular tire engaging means telescopically attached to each spoke, the opening in the tire engaging means corresponding in size and shape to the outside of the spoke, the outer ends of the tire engaging means having an elongated tire engaging surface extending in the direction of the axis of the shaft, and means for adjusting the positions of the tire engaging means along the spokes to adapt the device for engagement with tire openings of different sizes, said means comprising a pawl pivotally attached to the inner end of each tubular tire engaging means for movement into latching engagement with a notch in the corresponding spoke, a lever formed integrally with the pawl, and a means comprising a spring for urging the pawl into notch engaging position, the parts being so proportioned that when the tire engaging surfaces are equidistantly spaced from the axis of the shaft, the device is statically balanced with respect to the center of the shaft.

CHRIS L. PETERSON.